Dec. 1, 1936.         E. H. HILTY ET AL         2,062,905
AUTOMATIC MOTOR CUT-OFF AND ALARM
Filed Nov. 5, 1935
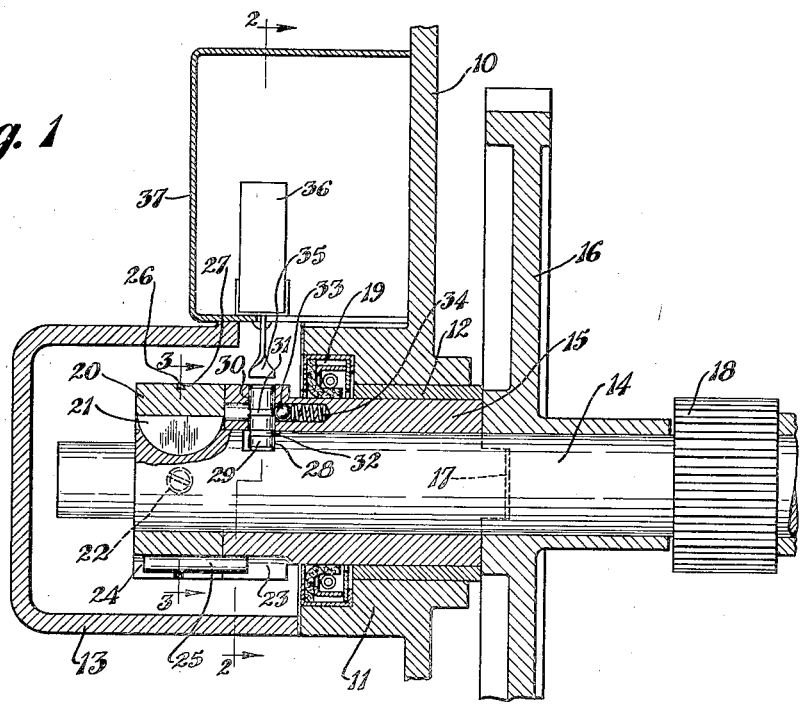
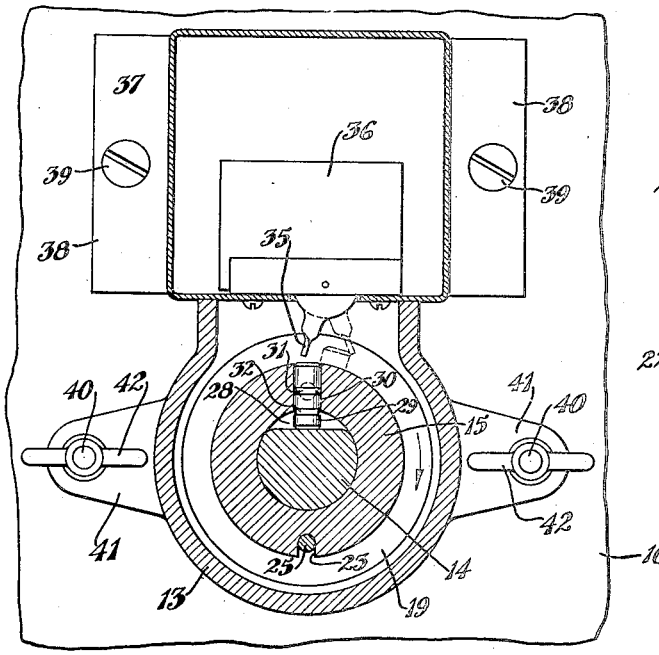
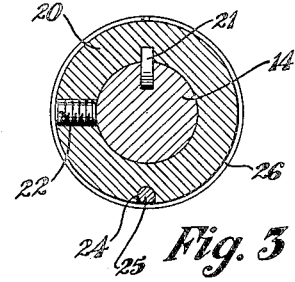
Inventors
E. H. Hilty and
H. F. Umstott Patented Dec. 1, 1936

2,062,905

UNITED STATES PATENT OFFICE 2,062,905

AUTOMATIC MOTOR CUT-OFF AND ALARM

Evert H. Hilty and Harold F. Umstott, Orrville, Ohio, assignors to The Will-Burt Company, Orrville, Ohio, a corporation of Ohio Application November 5, 1935, Serial No. 48,340

3 Claims. (Cl. 200—52)

The invention relates to a device for automatically cutting off an electric motor and if desired also giving a warning signal in the event of the failure of the shear pin in an apparatus such as a mechanical stoker.

It is common practice in the construction of furnace stokers to provide a shear pin which will fail under an excessive load or obstruction in the feed screw which conveys the fuel from a hopper or bin to the furnace. The shearing of the pin results in stopping the operation of the feed screw but ordinarily the electric motor driving the apparatus continues to run and in turn continues to drive the usual fan provided in furnace stokers with the result that the coal remaining in the fire pot of the furnace continues to burn and when the fire reaches a point opposite the air ports, a blow torch effect is produced, frequently resulting in melting down the tuyères, causing expensive repairs and an interruption in the heating service.

The object of the present improvement is to provide means for automatically operating an electric switch when the pin is sheared, this switch controlling the ordinary circuit to the motor and also an ordinary electric circuit to an audible or visible alarm signal or both, if desired, whereby all parts of the mechanism are instantly stopped and warning is given of the failure of the mechanism so that the shear pin may be immediately replaced and the mechanism again put into operation.

Another object is to provide a device of this character including a countershaft having a shear pin coupling mounted thereon and adapted to be connected by the shear pin with a shear pin collar fixed upon the countershaft, means being provided for operatively connecting the shear pin collar to a motor, the countershaft being operatively connected to the feed screw of the stoker, an electric switch controlling the motor as well as an alarm signal being located adjacent to the shear pin coupling, a radially disposed throw-out pin being located through the shear pin coupling, the inner end thereof being normally received within a notch in the shaft, whereby shearing of the pin will cause the shaft to stop rotating and permit the shear pin coupling to continue to rotate until the throw-out pin is forced outward engaging the switch and throwing the same to the open position, stopping the motor and operating the alarm signal.

The above objects, together with others which will be obvious from the drawing and following description or which may be later pointed out, may be attained by constructing the device in the manner illustrated in the accompanying drawing, in which Figure 1 is a sectional view of a portion of the gearing of a stoker showing the invention applied thereto;

Fig. 2, a transverse section taken as on the line 2—2, Fig. 1; and

Fig. 3, a transverse detail section taken as on the line 3—3, Fig. 1.

Similar numerals refer to similar parts throughout the drawing.

A portion of the gear housing is indicated at 10 and provided with an integral bearing 11 within which is mounted a bushing 12. A throw-out housing 13 is connected to the gear housing 10 and receives one end portion of the countershaft 14 which is surrounded by the shear pin coupling sleeve 15 journaled within the bushing 12.

This shear pin coupling is not fixed upon the shaft 14 excepting by the throw-out pin to be later described, whereby the coupling and shaft may rotate relative to each other when the throw-out pin is not engaged in the shaft.

The gear 16 is mounted upon but not fixed to the shaft 14 and is operatively connected to the adjacent end of the coupling sleeve 15 by any suitable means such as the multiple jaws 17. This gear 16 is operatively connected to an electric motor (not shown) through any suitable gear reduction so that the gear may be driven at the desired relative speed by the motor.

The shaft 14 may be operatively connected to the coal feed screw in any suitable manner and for this purpose a pinion 18 may be fixed upon the shaft 14 operatively engaged with any suitable gearing for driving the coal feed screw (not shown).

An oil seal, as indicated, generally at 19, may be provided within the bearing 11 around the shear pin coupling sleeve 15. A shear pin collar 20 is fixed against rotation upon the end portion of the shaft 14 as by the woodruff key 21 and may also be fixed against longitudinal movement thereon as by the set screw 22.

The shear pin coupling sleeve 15 and collar 20 may be connected together by any suitable form of shear pin, preferably in the manner shown, the sleeve and collar being provided with longitudinal grooves 23 and 24 respectively, adapted to register with each other to receive the shear pin 25 which may be retained in position as by a split spring ring 26 seated in a peripheral groove 27 in the collar.

A transverse or peripheral notch 28 is formed in the shaft 14 to receive the inner end of the throw-out pin 29 which is slidably mounted in a radial bore 30 in the shear pin sleeve 15. The remainder of the periphery of the shaft forms a cam surface to project the throw-out pin out of said notch when the shear pin is operated. The spaced peripheral grooves 31 and 32 are formed upon the throw-out pin 29 and adapted to be engaged by friction means such as the ball 33 normally urged into one or the other of the grooves as by the spring 34 in order to hold the pin in either of its two positions.

With the throw-out pin in the normal position, the spring pressed ball 33 engages the groove 31 of the pin, holding the pin in position so that its outer end does not project beyond the periphery of the sleeve 15, thus clearing the switch lever 35 upon the switch 36 which controls the circuit (not shown) to the motor and also an ordinary electric circuit leading to an alarm signal (not shown) which may be either audible or visible, or both, if desired. The switch 36 may be enclosed within the switch box 37 which may be mounted upon the gear housing 10 as by the flanges 38 and screws 39. The throw-out housing 13 may be connected to the gear housing as by screw studs 40 located through the ears 41 upon the throw-out housing and provided with thumb nuts 42.

In the operation of the apparatus, the gear 16 will be driven by the motor and through the multiple jaws 17, will drive the sleeve 15 which in turn, through the shear pin 25 and collar 20, will drive the shaft 14 which, through the pinion 18 or the like, will drive the coal feed screw. The rotation of these parts is in the direction of the arrow shown in Fig. 2.

In the event the pin 25 is sheared due to an overload of the coal feed screw, the rotation of the coal feed screw and shaft 14 will be immediately stopped. However, the motor will continue to drive the sleeve 15 through the gear 16. As the sleeve 15 continues to turn about the stationary shaft 14, the throw-out pin 29 will be forced out of the notch 28 and the spring pressed ball 33 will engage the groove 32 of the throw-out pin, holding the same in the path of the switch lever 35 and as the sleeve 15 completes a revolution, the throw-out pin will engage the switch lever, throwing the same to the off position, as shown in broken lines, in Fig. 2, thus opening the circuit to the motor, stopping the same and all moving parts of the apparatus and at the same time closing the circuit to the warning signal, giving warning that the pin has sheared and the apparatus has stopped.

This not only saves injury to the apparatus but gives a warning so that the operator may immediately correct the trouble, place a new shear pin in position, and start the apparatus. This is of great advantage in many installations where an even temperature must be maintained and where even a slight drop in temperature might result in serious consequences, such as greenhouses, hospitals, chicken hatcheries and the like.

At the time the shear pin 25 shears, it creates a thrust between the shear pin coupling sleeve 15 and the shear pin collar 20. The set screw 22 takes care of this thrust in one direction and the throw-out pin 29 in the notch 28 in the countershaft takes the thrust in the other direction.

We claim:

1. Apparatus including a shaft, a shear pin coupling sleeve upon the shaft, means for rotating one of said members, a shear pin normally connecting the sleeve to the shaft, a throw-out pin transversely slidable in the sleeve, the shaft having a peripheral notch normally receiving the inner end of the throw-out pin, the remainder of the periphery of the shaft forming a cam surface to project the throw-out pin out of said notch when the shear pin is operated, and a switch adapted to be operated by said throw-out pin.

2. Apparatus including a shaft, a shear pin coupling sleeve upon the shaft, means for rotating one of said members, a shear pin normally connecting the sleeve to the shaft, a throw-out pin transversely slidable in the sleeve, the shaft having a peripheral notch normally receiving the inner end of the throw-out pin, the remainder of the periphery of the shaft forming a cam surface to project the throw-out pin out of said notch when the shear pin is operated, friction means for holding the throw-out pin in either position, and a switch adapted to be operated by said throw-out pin.

3. Apparatus including a shaft, a shear pin coupling sleeve upon the shaft, means for rotating one of said members, a shear pin normally connecting the sleeve to the shaft, a throw-out pin transversely slidable in the sleeve, the shaft having a peripheral notch normally receiving the inner end of the throw-out pin, the remainder of the periphery of the shaft forming a cam surface to project the throw-out pin out of said notch when the shear pin is operated, the throw-out pin having spaced peripheral grooves, a spring pressed ball adapted to engage either groove, and a switch adapted to be operated by said throw-out pin.

EVERT H. HILTY.
HAROLD F. UMSTOTT.